(12) United States Patent
Akita (10) Patent No.: US 9,759,153 B2
(45) Date of Patent: Sep. 12, 2017

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Tatsuhiko Akita, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 34 days.

(21) Appl. No.: 15/085,668

(22) Filed: Mar. 30, 2016

(65) Prior Publication Data

US 2016/0305361 A1 Oct. 20, 2016

(30) Foreign Application Priority Data

Apr. 14, 2015 (JP) ................................ 2015-082629

(51) Int. Cl.
| | |
|---|---|
| *F02D 41/30* | (2006.01) |
| *F02M 25/08* | (2006.01) |
| *F02D 41/18* | (2006.01) |
| *F02D 41/24* | (2006.01) |
| *F02D 41/34* | (2006.01) |
| *F02D 41/00* | (2006.01) |

(Continued)

(52) U.S. Cl.
CPC ..... *F02D 41/3064* (2013.01); *F02D 41/0002* (2013.01); *F02D 41/0007* (2013.01); *F02D 41/0042* (2013.01); *F02D 41/1454* (2013.01); *F02D 41/18* (2013.01); *F02D 41/2438* (2013.01); *F02D 41/2445* (2013.01); *F02D 41/2454* (2013.01); *F02D 41/34* (2013.01); *F02B 37/00* (2013.01); *F02D 41/1486* (2013.01); *F02M 25/08* (2013.01); *F02M 25/0836* (2013.01); *F02M 25/0854* (2013.01)

(58) Field of Classification Search
CPC ...... F02D 41/30; F02D 41/00; F02D 41/0002; F02D 41/0007; F02D 41/18; F02D 41/24; F02D 41/2438; F02D 41/2445; F02D 41/34; F02M 25/08; F02M 25/0836; F02M 25/0854

See application file for complete search history.

(56) References Cited

U.S. PATENT DOCUMENTS 5,158,054 A * 10/1992 Otsuka ............... F02M 25/0809
123/198 D

FOREIGN PATENT DOCUMENTS

| JP | 2007-278094 A | 10/2007 |
|---|---|---|
| JP | 2007-332855 A | 12/2007 |

* cited by examiner

*Primary Examiner* — Hieu T Vo
(74) *Attorney, Agent, or Firm* — Oliff PLC (57) ABSTRACT

In a control apparatus for an internal combustion engine, a vapor concentration learned value learned as a concentration of fuel in purge gas is reflected in an injection amount command value used for fuel injection amount control. An electronic control unit changes a reflection mode of reflecting the vapor concentration learned value in the injection amount command value depending on a pattern of switching an inlet through which the purge gas flows into an intake passage, between a first inlet and a second inlet upstream of the first inlet, and executes the reflection in the changed reflection mode during a period from a start of an intake of intermediate gas into a cylinder to completion of the intake of the intermediate gas. The intermediate gas is present in a portion of the intake passage between the first inlet and the second inlet when switching of the inlet is performed.

3 Claims, 2 Drawing Sheets

(51) Int. Cl.
*F02D 41/14* (2006.01)
*F02B 37/00* (2006.01)

CONTROL APPARATUS FOR INTERNAL COMBUSTION ENGINE

INCORPORATION BY REFERENCE

The disclosure of Japanese Patent Application No. 2015-082629 filed on Apr. 14, 2015 including the specification, drawings and abstract is incorporated herein by reference in its entirety.

BACKGROUND OF THE INVENTION

1. Field of the Invention

The invention relates to a control apparatus for an internal combustion engine.

2. Description of Related Art

Some internal combustion engines are configured such that vaporized fuel generated in a fuel tank flows, together with air, into an intake passage as purge gas through a vaporized fuel processing device. In such an internal combustion engine, if the concentration of fuel in the purge gas is not taken into account in executing fuel injection amount control, the amount of fuel injected into the engine (hereinafter, simply referred to as "fuel injection amount") deviates from its proper value and such a deviation exerts an adverse effect on the air-fuel ratio in the engine. In view of this, the concentration of fuel in the purge gas flowing into the intake passage is learned as a vapor concentration learned value, and the vapor concentration learned value is reflected in an injection amount command value used for the fuel injection amount control for the internal combustion engine. In this way, the fuel injection amount is inhibited from deviating from its proper value due to an inflow of the purge gas into the intake passage.

In addition, a throttle valve that adjusts the intake air amount is provided in the intake passage of the internal combustion engine, and the purge gas is caused to flow into the intake passage with the use of a negative pressure generated in a portion of the intake passage downstream of the throttle valve. However, in an internal combustion engine with a turbocharger, such a negative pressure is less likely to be generated, and thus the purge gas is also caused, by a pump, to flow into a portion of an intake passage upstream of a throttle valve.

In this case, as described in Japanese Patent Application Publication No. 2007-332855 (JP 2007-332855 A), a portion of an intake passage downstream of a throttle valve is provided with a first inlet through which purge gas is caused to flow into the intake passage with the use of a negative pressure, whereas a portion of the intake passage upstream of the throttle valve is provided with a second inlet through which the purge gas is caused to flow into the intake passage with the use of a pump. The inlet through which the purge gas flows into the intake passage is switched between the first inlet and the second inlet, depending on, for example, the state of a negative pressure generated in the portion of the intake passage downstream of the throttle valve.

SUMMARY OF THE INVENTION

When the inlet through which the purge gas flows into the intake passage is switched between the first inlet and the second inlet, the amount of purge gas in the gas taken into a cylinder of an internal combustion engine through the intake passage varies depending on the pattern of switching the inlet (i.e., depending on whether the inlet is switched from the first inlet to the second inlet, or switched from the second inlet to the first inlet).

More specifically, when the inlet through which the purge gas flows into the intake passage is switched from the first inlet to the second inlet, the purge gas is not contained in the gas present in a portion of the intake passage between the first inlet and the second inlet at the time when the switching is performed (hereinafter, referred to as "intermediate gas"). After the switching is performed, the gas is continuously taken into the cylinder of the internal combustion engine while the purge gas flows through the second inlet into a portion of the intake passage upstream of where the intermediate gas is present. Thus, when the intermediate gas is taken into the cylinder of the internal combustion engine, the purge gas is not contained in the intermediate gas.

On the other hand, when the inlet through which the purge gas flows into the intake passage is switched from the second inlet to the first inlet, the purge gas is contained in the intermediate gas at the time when the switching is performed. After the switching is performed, the gas is continuously taken into the cylinder of the internal combustion engine while the purge gas flows also through the first inlet into a portion of the intake passage corresponding to where the intermediate gas is present. Thus, when the intermediate gas is taken into the cylinder of the internal combustion engine, the intermediate gas contains a larger amount of purge gas.

As described above, when the intermediate gas is taken into the cylinder of the internal combustion engine after the inlet is switched, the amount of purge gas contained in the intermediate gas varies depending on the pattern of switching the inlet. Thus, the amount of fuel in the purge gas contained in the intermediate gas also varies depending on the pattern of switching the inlet.

For this reason, when the intermediate gas is taken into the cylinder of the internal combustion engine after the inlet is switched, if a vapor concentration learned value is reflected in an injection amount command value in a uniform manner regardless of the pattern of switching the inlet, the injection amount command value that reflects the vapor concentration learned value is not a value corresponding to the amount of fuel in the purge gas contained in the intermediate gas to be taken into the cylinder. If the fuel injection amount is controlled based on such an injection amount command value, the fuel injection amount deviates from its proper value and such a deviation exerts an adverse effect on the air-fuel ratio in the engine.

The invention provides a control apparatus for an internal combustion engine, the control apparatus being configured to inhibit the fuel injection amount from deviating from its proper value due to switching of an inlet through which purge gas flows into an intake passage between a first inlet and a second inlet.

A control apparatus for an internal combustion engine according to an aspect of the invention is applied to an internal combustion engine configured such that vaporized fuel generated in a fuel tank flows, together with air, into an intake passage as purge gas through a vaporized fuel processing device. The control apparatus is configured to reflect a vapor concentration learned value learned as a concentration of fuel in the purge gas, in an injection amount command value used for fuel injection amount control for the internal combustion engine. The control apparatus includes a switching unit that switches an inlet through which the purge gas flows into the intake passage, between a first inlet and a second inlet provided upstream of the first inlet in the intake passage. The control apparatus further includes a changing unit configured to change a reflection mode of reflecting the vapor concentration learned value in the injection amount command value depending on a pattern in which the inlet is switched by the switching unit (depending on whether the inlet is switched by the switching unit from the first inlet to the second inlet, or from the second inlet to the first inlet). The changing unit is configured to reflect the vapor concentration learned value in the injection amount command value in the changed reflection mode (post-change reflection mode), during a period from a start of an intake of gas into a cylinder of the internal combustion engine to completion of the intake of the gas into the cylinder of the internal combustion engine. The gas is gas present in a portion of the intake passage, the portion being between the first inlet and the second inlet, when switching of the inlet through which the purge gas flows into the intake passage is performed by the switching unit. The aspect of the invention may be defined as follows. A control apparatus for an internal combustion engine is applied to an internal combustion engine configured such that vaporized fuel generated in a fuel tank flows, together with air, into an intake passage as purge gas through a vaporized fuel processing device. The control apparatus is configured to reflect a vapor concentration learned value learned as a concentration of fuel in the purge gas, in an injection amount command value used for fuel injection amount control for the internal combustion engine. The control apparatus includes a switching unit and an electronic control unit. The switching unit is configured to switch an inlet through which the purge gas flows into the intake passage, between a first inlet and a second inlet. The second inlet is provided upstream of the first inlet in the intake passage. The electronic control unit is configured to change a reflection mode of reflecting the vapor concentration learned value in the injection amount command value depending on a pattern in which the inlet is switched by the switching unit (depending on whether the inlet is switched by the switching unit from the first inlet to the second inlet, or from the second inlet to the first inlet). The electronic control unit is configured to reflect the vapor concentration learned value in the injection amount command value in the changed reflection mode, during a period from a start of an intake of gas into a cylinder of the internal combustion engine to completion of the intake of the gas into the cylinder of the internal combustion engine. The gas is gas present in a portion of the intake passage, the portion being between the first inlet and the second inlet, when switching of the inlet through which the purge gas flows into the intake passage is performed by the switching unit.

After the inlet through which the purge gas flows into the intake passage is switched between the first inlet and the second inlet, when the gas present in the portion of the intake passage between the first inlet and the second inlet at the time of switching the inlet (hereinafter, referred to as "intermediate gas") is taken into the cylinder of the internal combustion engine, the amount of purge gas contained in the intermediate gas varies depending on the pattern of switching the inlet. Thus, the amount of fuel in the purge gas contained in the intermediate gas when the intermediate gas is taken into the cylinder also varies depending on the pattern of switching the inlet. When the intermediate gas is taken into the cylinder of the internal combustion engine, if the vapor concentration learned value is reflected in the injection amount command value in a uniform manner regardless of the pattern of switching the inlet, the fuel injection amount controlled based on the injection amount command value deviates from its proper value.

With the foregoing configuration, when the intermediate gas is taken into the cylinder of the internal combustion engine after switching of the inlet through which the purge gas flows into the intake passage is performed, the reflection mode of reflecting the vapor concentration learned value in the injection amount command value is changed depending on the pattern of switching the inlet. Thus, the fuel injection amount controlled based on the injection amount command value in which the vapor concentration learned value has been reflected is less likely to deviate from its proper value. In other words, as described above, by changing the reflection mode of reflecting the vapor concentration learned value in the injection amount command value depending on the pattern of switching the inlet, it is possible to reflect the vapor concentration learned value in the injection amount command value in a reflection mode corresponding to the amount of fuel in the purge gas contained in the intermediate gas. Thus, the fuel injection amount controlled based on the injection amount command value in which the vapor concentration learned value has been reflected is less likely to deviate from its proper value.

The changing unit may be configured to reflect, when the inlet through which the purge gas flows into the intake passage is switched from the first inlet to the second inlet by the switching unit, the vapor concentration learned value that is made lower than the vapor concentration learned value at the time of switching the inlet, in the injection amount command value, during the period from the start of the intake of the intermediate gas into the cylinder of the internal combustion engine to the completion of the intake of the intermediate gas into the cylinder of the internal combustion engine.

When the inlet through which the purge gas flows into the intake passage is switched from the first inlet to the second inlet, fuel in the purge gas is not contained in the intermediate gas at the time when the switching is performed. Thus, the gas is continuously taken into the cylinder of the internal combustion engine while the purge gas flows through the second inlet into a portion of the intake passage upstream of where the intermediate gas is present. Thus, when the intermediate gas is taken into the cylinder of the internal combustion engine, fuel in the purge gas is not contained in the intermediate gas. Therefore, by reflecting the vapor concentration learned value that is made lower than the vapor concentration learned value at the time of switching the inlet, in the injection amount command value, during the period from the start of the intake of the intermediate gas into the cylinder of the internal combustion engine to the completion of the intake of the intermediate gas into the cylinder of the internal combustion engine, it is possible to inhibit the fuel injection amount controlled based on the injection amount command value from deviating from its proper value.

The changing unit may be configured to reflect, when the inlet through which the purge gas flows into the intake passage is switched from the second inlet to the first inlet by the switching unit, the vapor concentration learned value that is made higher than the vapor concentration learned value at the time of switching the inlet, in the injection amount command value, during the period from the start of the intake of the intermediate gas into the cylinder of the internal combustion engine to the completion of the intake of the intermediate gas into the cylinder of the internal combustion engine.

When the inlet through which the purge gas flows into the intake passage is switched from the second inlet to the first inlet, the purge gas is contained in the intermediate gas at the time when the switching is performed. Thus, the gas is continuously taken into the cylinder of the internal combustion engine while the purge gas flows also through the first inlet into a portion of the intake passage corresponding to where the intermediate gas is present. As a result, when the intermediate gas is taken into the cylinder, the amount of purge gas contained in the intermediate gas is increased, and thus the amount of fuel in the purge gas contained in the intermediate gas is also increased. Therefore, by reflecting the vapor concentration learned value that is made higher than the vapor concentration learned value at the time of switching the inlet, in the injection amount command value, during the period from the start of the intake of the intermediate gas into the cylinder of the internal combustion engine to the completion of the intake of the intermediate gas into the cylinder of the internal combustion engine, it is possible to inhibit the fuel injection amount controlled based on the injection amount command value from deviating from its proper value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
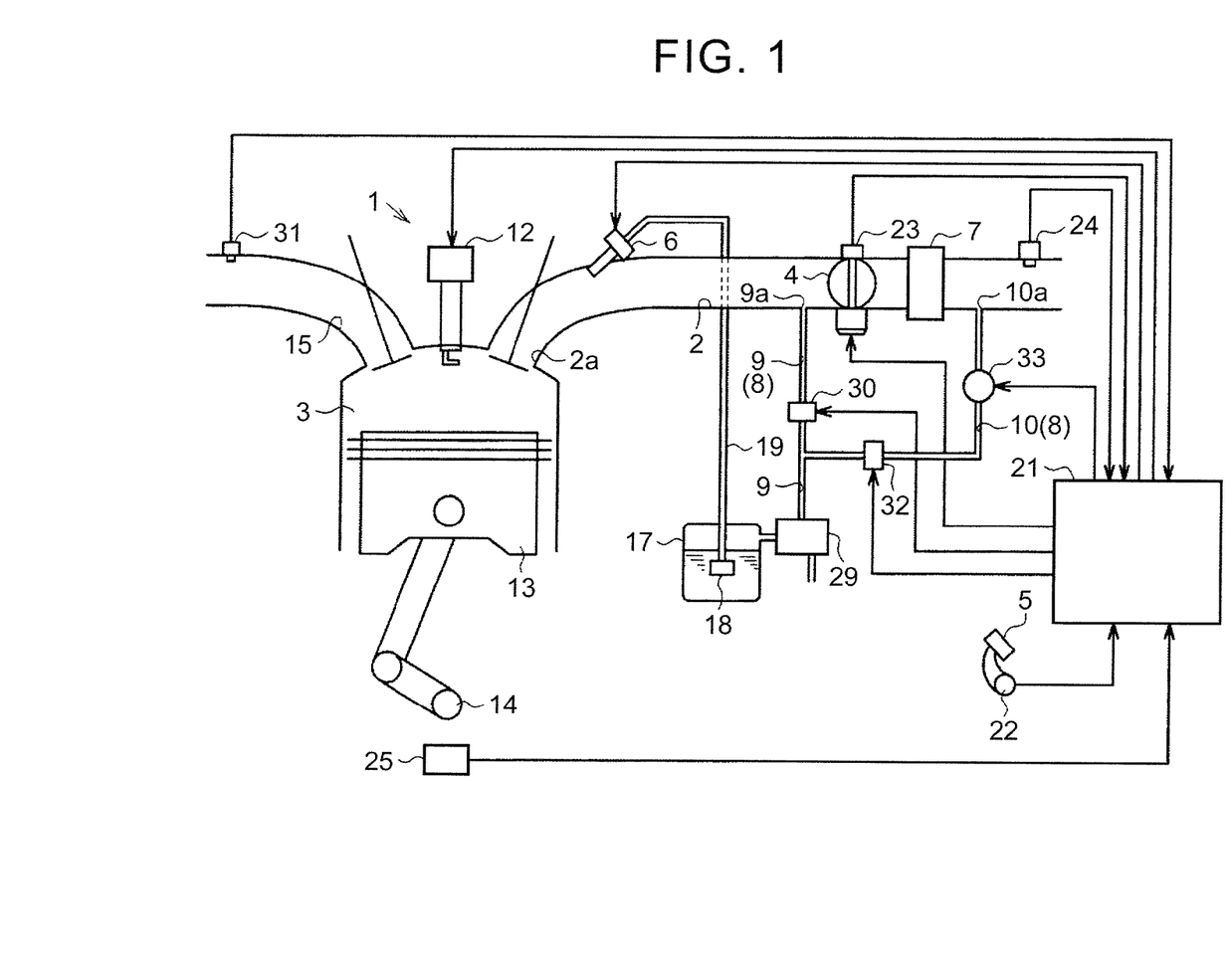
FIG. 1 is a diagram schematically illustrating the overall configuration of a control apparatus for an internal combustion engine.
Figure 2:
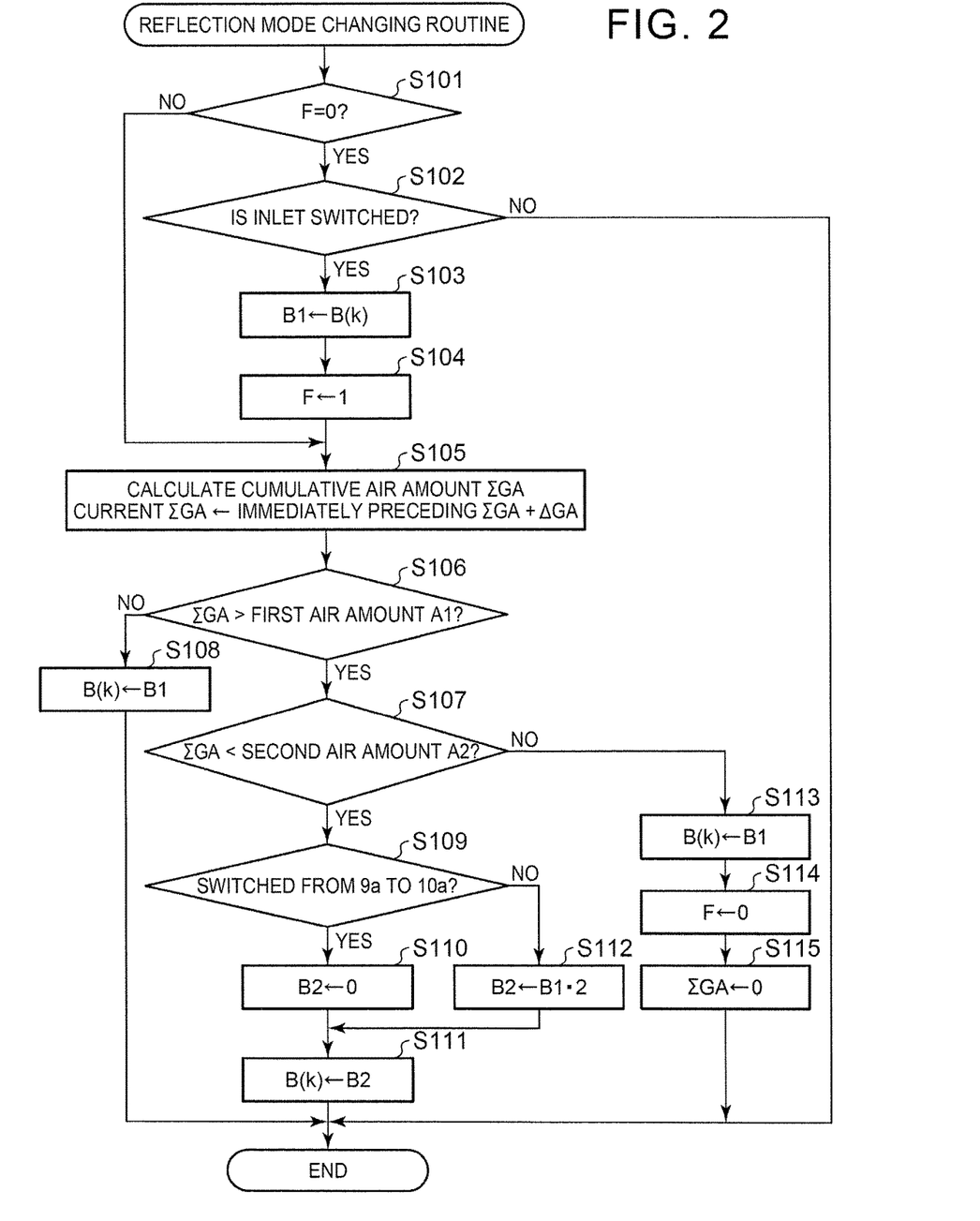
FIG. 2 is a flowchart illustrating the procedure for changing the reflection mode of reflecting a vapor concentration learned value in an injection amount command value.

Hereinafter, an embodiment of a control apparatus for an internal combustion engine mounted in a vehicle, such as an automobile, will be described with reference to FIG. 1 and FIG. 2. As illustrated in FIG. 1, an intake passage 2 of an internal combustion engine 1 is provided with a throttle valve 4 that opens and closes to adjust the amount of air to be taken into a combustion chamber (cylinder) 3 (intake air amount). The opening degree of the throttle valve 4 (throttle opening degree) is adjusted based on the operation amount of an accelerator pedal 5 that is depressed by a driver of the vehicle (accelerator operation amount).

A turbocharger 7 is provided on the intake passage 2 of the internal combustion engine 1, at a position upstream of the throttle valve 4. The turbocharger 7 sends air to the downstream side of the intake passage 2. Note that, the turbocharger 7 may be a turbine-driven forced induction device that is driven by the exhaust gas discharged from the internal combustion engine 1.

The internal combustion engine 1 includes an injector (fuel injection valve) 6 for port injection. The injector 6 injects fuel toward an intake port 2a where the intake passage 2 and the combustion chamber 3 are connected to each other. The fuel is drawn up from a fuel tank 17 by a feed pump 18, and then supplied to the injector 6 through a fuel pipe 19.

Then, in the internal combustion engine 1, the combustion chamber 3 is filled with an air-fuel mixture composed of the fuel injected from the injector 6 and the air supplied through the intake passage 2. When the air-fuel mixture is ignited by a spark plug 12, the air-fuel mixture burns and the energy released by the combustion causes a reciprocating motion of a piston 13. In response to the reciprocating motion of the piston 13, a clank shaft 14 rotates. The air-fuel mixture after combustion is sent, as exhaust gas, to an exhaust passage 15.

In the vehicle provided with the internal combustion engine 1, a vaporized fuel processing device that processes vaporized fuel (vapor) generated in, for example, the fuel tank 17 is provided. The vaporized fuel processing device includes a canister 29 provided with an adsorbent, such as activated carbon, which adsorbs the vaporized fuel generated in the fuel tank 17. Air is introduced into the canister 29, and the vaporized fuel adsorbed to the adsorbent is caused to flow, together with the air, into the intake passage 2 as purge gas. The vaporized fuel in the purge gas that has flowed into the intake passage 2 in this manner is processed by burning in the combustion chamber 3 of the internal combustion engine 1.

Next, the structure for causing the purge gas to flow into the intake passage 2 will be described in detail. A purge pipe 8 through which the purge gas flows into the intake passage 2 is connected to the canister 29 of the vaporized fuel processing device. The purge pipe 8 branches out into a first branch pipe 9 connected to a portion of the intake passage 2 downstream of the throttle valve 4, and a second branch pipe 10 connected to a portion of the intake passage 2 upstream of the turbocharger 7. The portion of the intake passage 2 to which the first branch pipe 9 is connected serves as a first inlet 9a through which the purge gas flows from the first branch pipe 9 into the intake passage 2. The portion of the intake passage 2 to which the second branch pipe 10 is connected serves as a second inlet 10a through which the purge gas flows from the second branch pipe 10 into a portion of the intake passage 2 upstream of the first inlet 9a.

A purge control valve 30 is provided at an intermediate portion of the first branch pipe 9. The opening degree of the purge control valve 30 is controlled to adjust the flow rate of the purge gas flowing into the intake passage 2 from the first branch pipe 9 (through the first inlet 9a). An on-off valve 32 and a purge pump 33 are provided at intermediate portions of the second branch pipe 10. The on-off valve 32 opens to permit the flow of gas through the second branch pipe 10, and closes to interrupt the flow of gas through the second branch pipe 10. The purge pump 33 is driven to cause the purge gas to flow into the intake passage 2 from the second branch pipe 10 (through the second inlet 10a). The purge control valve 30, the on-off valve 32, and the purge pump 33 function as a switching unit that switches the inlet through which the purge gas flows into the intake passage 2, between the first inlet 9a and the second inlet 10a.

More specifically, when the on-off valve 32 is closed, the purge pump 33 is stopped, and the purge control valve 30 is opened, the inlet through which the purge gas flows into the intake passage 2 is switched to the first inlet 9a. On the other hand, when the purge control valve 30 is closed, the on-off valve 32 is opened, and the purge pump 33 is driven, the inlet through which the purge gas flows into the intake passage 2 is switched to the second inlet 10a. In other words, through the above-described operations of the purge control valve 30, the on-off valve 32, and the purge pump 33, the inlet through which the purge gas flows into the intake passage 2 is switched between the first inlet 9a and the second inlet 10a.

Next, the electrical configuration of the control apparatus for the internal combustion engine 1 will be described. The control apparatus includes an electronic control unit (ECU) 21 mounted in the vehicle. The electronic control unit 21 includes, for example, a central processing unit (CPU) that executes various computations related to various operation controls for the internal combustion engine 1, read-only memory (ROM) in which programs and data necessary for the controls are stored, random-access memory (RAM) in which, for example, the results of computations executed by the CPU are temporarily stored, an input port that receives signals from external devices, and an output port that outputs signals to external devices.

Various sensors and the like described below are connected to the input port of the electronic control unit 21. The various sensors include an accelerator position sensor 22 that detects an accelerator operation amount, and a throttle position sensor 23 that detects a throttle opening degree.

The various sensors further include an air flow meter 24 that detects an amount of air flowing through the intake passage 2 (an amount of air to be taken into the internal combustion engine 1), and a clank position sensor 25 that outputs a signal corresponding to the rotation of the clank shaft 14.

The various sensors further include an air-fuel ratio sensor 31 that outputs a signal corresponding to the oxygen concentration in the exhaust gas flowing through the exhaust passage 15. In addition, for example, driving circuits for the various devices for driving the internal combustion engine 1 and the vaporized fuel processing device are connected to the output port of the electronic control unit 21. The various devices include the throttle valve 4, the injector 6, the spark plug 12, the purge control valve 30, the on-off valve 32, and the purge pump 33.

The electronic control unit 21 acquire engine operating states, such as an engine speed and an engine load, based on the signals received from the various sensors and the like. Then, based on the acquired engine operating states, the electronic control unit 21 outputs command signals to the driving circuits for, for example, the throttle valve 4, the injector 6, and the spark plug 12. In this way, various operation controls for the internal combustion engine 1, such as throttle opening degree control, fuel injection amount control, ignition timing control, and purge control for the internal combustion engine 1, are executed by the electronic control unit 21. Further, the electronic control unit 21 outputs command signals to the driving circuits for, for example, the purge control valve 30, the on-off valve 32, and the purge pump 33, based on the engine operating states. In this manner, various operation controls for the vaporized fuel processing device, such as flow rate control of the purge gas flowing into the intake passage 2 (purge control) and switching control of the inlet through which the purge gas flows into the intake passage 2, are executed by the electronic control unit 21.

Next, the fuel injection amount control for the internal combustion engine 1, which is executed by the electronic control unit 21, will be described in detail. The fuel injection amount control for the internal combustion engine 1 is executed in order to perform fuel injection from the injector 6 such that the fuel in an amount required in the internal combustion engine 1 is supplied. Based on an injection amount command value Qfin calculated by Expression (1) indicated below, the fuel injection amount control is implemented by driving the injector 6 such that the injector 6 injects the fuel in an amount corresponding to the injection amount command value Qfin.

$$Q\text{fin} = Q\text{base} \cdot (FAF \cdot KG(i) - PGR \cdot B(k)) \quad \text{Expression (1)}$$

In Expression (1), Qfin represents an injection amount command value, Qbase represents a basic fuel injection amount, FAF represents a feedback correction coefficient, KG(i) represents an air-fuel ratio learned value, PGR represents a target purge rate, and B(k) represents a vapor concentration learned value. Next, the basic fuel injection amount Qbase, the feedback correction coefficient FAF, the air-fuel ratio learned value KG(i), the target purge rate PGR, and the vapor concentration learned value B(k) used in Expression (1) will be individually described in detail.

First, the basic fuel injection amount Qbase will be described. The basic fuel injection amount Qbase is a value representing a theoretical fuel injection amount for bringing the air-fuel ratio of the air-fuel mixture in the combustion chamber 3 to a target air-fuel ratio (for example, a stoichiometric air-fuel ratio). The basic fuel injection amount Qbase is calculated based on the engine speed and the engine load. Note that, the engine speed is obtained based on a detection signal from the clank position sensor 25. The engine load is calculated from a parameter corresponding to the amount of air taken into the internal combustion engine 1 (intake air amount) and the engine speed. As the parameter corresponding to the intake air amount, an intake air pressure, a throttle opening degree, an accelerator depression amount, or the like may be used.

Next, the feedback correction coefficient FAF will be described. The feedback correction coefficient FAF is a value used for feedback correction of the fuel injection amount (air-fuel ratio feedback control) for bringing the air-fuel ratio of the air-fuel mixture in the combustion chamber 3 of the internal combustion engine 1 closer to the stoichiometric air-fuel ratio. The feedback correction coefficient FAF is increased or decreased with respect to "1.0" depending on whether the detection signal from the air-fuel ratio sensor 31 indicates a value leaner than or richer than a value exhibited when the air-fuel mixture having a stoichiometric air-fuel ratio is burned in the combustion chamber 3. More specifically, when the detection signal from the air-fuel ratio sensor 31 is a value richer than the value exhibited when the air-fuel mixture having a stoichiometric air-fuel ratio is burned in the combustion chamber 3, the feedback correction coefficient FAF is decreased to fall below "1.0", thereby correcting the fuel injection amount such that the fuel injection amount is decreased. On the other hand, when the detection signal from the air-fuel ratio sensor 31 is a value leaner than the value exhibited when the air-fuel mixture having a stoichiometric air-fuel ratio is burned in the combustion chamber 3, that is, when combustion of the air-fuel mixture is lean combustion, the feedback correction coefficient FAF is increased to exceed "1.0", thereby correcting the fuel injection amount such that the fuel injection amount is increased. By correcting the fuel injection amount based on the feedback correction coefficient FAF in this way, the air-fuel ratio of the air-fuel mixture in the combustion chamber 3 of the internal combustion engine 1 is brought closer to the stoichiometric air-fuel ratio.

Next, the air-fuel ratio learned value KG(i) will be described. In some fuel injection amount regions, the linearity of the variation in the fuel injection amount with respect to the variation in the valve open time command value for the injector 6 deteriorates due to the structure of the injector 6, leading to steady deviation of the fuel injection amount from its proper value. The air-fuel ratio learned value KG(i) is a value used to compensate for such steady deviation of the fuel injection amount from its proper value. Through a learning process executed during the air-fuel ratio feedback control, the air-fuel ratio learned value KG(i) is increased or decreased to correct the fuel injection amount such that an average value FAFAV of the feedback correction coefficient FAF converges (falls) within a prescribed range around "1.0". In other words, the air-fuel ratio learned value KG(i) is gradually increased when the average value FAFAV exceeds the upper limit of the prescribed range, whereas the air-fuel ratio learned value KG(i) is gradually decreased when the average value FAFAV falls below the lower limit of the prescribed range. By increasing or decreasing the air-fuel ratio learned value KG(i) based on the average value FAFAV, the average value FAFAV converges within the prescribed range. Upon convergence of the average value FAFAV within the prescribed range, the learning process of the air-fuel ratio learned value KG(i) is completed. The air-fuel ratio learned value KG(i) after completion of the learning process is a value that allows compensation for steady deviation of the fuel injection amount of the injector 6 from its proper value.

Note that, the air-fuel ratio learned value KG(i) is set for each of multiple learning regions i (i=0, 1, 2, 3, 4, . . . ) obtained through segmentation based on the fuel injection amount. As the air-fuel ratio learned value KG(i) in Expression (1), the air-fuel ratio learned value KG(i) corresponding to the learning region i including the fuel injection amount of the moment is used.

Next, the target purge rate PGR will be described. The target purge rate PGR is a target value of a purge rate. The purge rate is a value indicating the ratio of the amount of purge gas to the amount of air taken into the internal combustion engine 1. The purge rate is calculated based on, for example, the latest value of the feedback correction coefficient FAF. For example, the target purge rate PGR is set to a higher value as the feedback correction coefficient FAF is lower. This is because, when the feedback correction coefficient FAF is low, deterioration of combustion is less likely to occur even if a large amount of purge gas flows into the intake passage 2, and thus, a large amount of vaporized fuel adsorbed to the adsorbent of the canister 29 can be processed.

Next, the vapor concentration learned value B(k) will be described. When the air-fuel ratio feedback control and the purge control are executed, the vapor concentration learned value B(k) is learned as a value corresponding to the concentration of vaporized fuel in the purge gas based on the variation in the feedback correction coefficient FAF due to inflow of the purge gas into the intake passage 2. Such learning of the vapor concentration learned value B(k) is executed according to Expression (2) indicated below with a prescribed period.

$$B(k)=B(k-1)+(FAF-1)/PGR \quad \text{Expression (2)}$$

In Expression (2), B(k) represents a latest vapor concentration learned value, B(k−1) represents an immediately preceding vapor concentration learned value, FAF represents a feedback correction coefficient, and PGR represents a target purge rate. The latest vapor concentration learned value B(k) calculated by Expression (2) is used as the term "PGR·B(k)" in Expression (1). This term is used to decrease the amount of fuel to be injected from the injector 6 by an amount corresponding to the amount of fuel contained in the purge gas flowing into the intake passage 2. Thus, when the purge gas is caused to flow into the intake passage 2 through the purge control, the fuel injection amount (i.e., the amount of fuel injected into internal combustion engine 1) is corrected by the term "PGR·B(k)" to reduce fluctuations in the air-fuel ratio due to the inflow of the purge gas into the intake passage 2.

Next, the purge control executed by the electronic control unit 21 will be described in detail. The purge control is executed when conditions such as a condition that the internal combustion engine 1 is not being subjected to a fuel supply cutoff process, a condition that the air-fuel ratio feedback control is being executed, and a condition that learning of the air-fuel ratio learned value KG(i) in the current learning region i has been completed are all satisfied. Then, adjustment of the flow rate of the purge gas flowing into the intake passage 2 in the purge control is performed through the opening degree control for the purge control valve 30 based on the target purge rate PGR or the discharge flow rate control for the purge pump 33 based on the target purge rate PGR.

Specifically, when the first inlet 9a is used as the inlet through which the purge gas flows into the intake passage 2, the flow rate of the purge gas flowing into the intake passage 2 through the first inlet 9a is adjusted through the opening degree control for the purge control valve 30 based on the target purge rate PGR. At this time, as the value of the target purge rate PGR is higher, the purge control valve 30 is controlled to be opened by a larger amount, and thus, the flow rate of the purge gas flowing into the intake passage 2 through the first inlet 9a is increased.

On the other hand, when the second inlet 10a is used as the inlet through which the purge gas flows into the intake passage 2, the flow rate of the purge gas flowing into the intake passage 2 through the second inlet 10a is adjusted through the discharge flow rate control for the purge pump 33 based on the target purge rate PGR. At this time, as the value of the target purge rate PGR is higher, the purge pump 33 is controlled to be driven so as to increase the discharge flow rate of the purge pump 33, and thus, the flow rate of the purge gas flowing into the intake passage 2 through the second inlet 10a is increased.

When the purge gas is flowing into the intake passage 2 from the canister 29 through the purge control, the air-fuel ratio of the air-fuel mixture in the combustion chamber 3 becomes a richer value due to the fuel component in the purge gas, and thus the injection amount command value Qfin is corrected to be decreased through the air-fuel ratio feedback control. Consequently, the injection amount command value Qfin that has been corrected to be decreased through the air-fuel ratio feedback control is a value determined with the vaporized fuel flowing into the intake passage 2 of the internal combustion engine 1 from the canister 29 taken into account, such that the fuel in an amount required in the internal combustion engine 1 is supplied.

Next, a problem that occurs when the inlet through which the purge gas flows into the intake passage 2 is switched between the first inlet 9a and the second inlet 10a will be described. When the inlet through which the purge gas flows into the intake passage 2 is switched between the first inlet 9a and the second inlet 10a while the purge gas is flowing into the intake passage 2, the amount of purge gas in the gas to be taken into the cylinder (the combustion chamber 3) of the internal combustion engine 1 through the intake passage 2 varies depending on the pattern of switching the inlet (i.e., depending on whether the inlet is switched from the first inlet 9a to the second inlet 10a, or switched from the second inlet 10a to the first inlet 9a).

More specifically, when the inlet through which the purge gas flows into the intake passage 2 is switched from the first inlet 9a to the second inlet 10a, the purge gas is not contained in the gas present in a portion of the intake passage 2 between the first inlet 9a and the second inlet 10a at the time when the switching is performed (hereinafter, referred to as "intermediate gas"). After the switching is performed, the gas is continuously taken into the cylinder of the internal combustion engine 1 while the purge gas flows through the second inlet 10a into a portion of the intake passage 2 upstream of where the intermediate gas is present. Thus, when the intermediate gas is taken into the cylinder of the internal combustion engine 1, the purge gas is not contained in the intermediate gas.

On the other hand, when the inlet through which the purge gas flows into the intake passage 2 is switched from the second inlet 10a to the first inlet 9a, the purge gas is contained in the intermediate gas at the time when the switching is performed. After the switching is performed, the gas is continuously taken into the cylinder of the internal combustion engine 1 while the purge gas flows also through the first inlet 9a into a portion of the intake passage 2 corresponding to where the intermediate gas is present. Thus, when the intermediate gas is taken into the cylinder of the internal combustion engine 1, the intermediate gas contains a larger amount of purge gas.

As described above, when the intermediate gas is taken into the cylinder of the internal combustion engine 1 after the inlet is switched, the amount of purge gas contained in the intermediate gas varies depending on the pattern of switching the inlet (i.e., depending on whether the inlet is switched from the first inlet 9a to the second inlet 10a, or switched from the second inlet 10a to the first inlet 9a). Thus, the amount of fuel in the purge gas contained in the intermediate gas also varies depending on the pattern of switching the inlet.

Thus, when the intermediate gas is taken into the cylinder of the internal combustion engine 1 after the inlet is switched, if the vapor concentration learned value B(k) is reflected in the injection amount command value Qfin in a uniform manner regardless of the pattern of switching the inlet, the injection amount command value Qfin that reflects the vapor concentration learned value B(k) is not a value corresponding to the amount of fuel in the purge gas contained in the intermediate gas to be taken into the cylinder. If the fuel injection amount for the internal combustion engine 1 is controlled based on such an injection amount command value Qfin, the fuel injection amount deviates from its proper value and such a deviation exerts an adverse effect on the air-fuel ratio in the internal combustion engine 1.

To address this problem, when the inlet through which the purge gas flows into the intake passage 2 is switched, the electronic control unit 21 reflects the vapor concentration learned value B(k) in the injection amount command value Qfin in a reflection mode changed (set) depending on the pattern of switching the inlet (i.e., depending on whether the inlet is switched from the first inlet 9a to the second inlet 10a, or switched from the second inlet 10a to the first inlet 9a), during a period from when the intermediate gas at the time of switching starts to be taken into the cylinder of the internal combustion engine 1 until when the intermediate gas is completely taken into the cylinder of the internal combustion engine 1. This makes it possible to reflect the vapor concentration learned value B(k) in the injection amount command value Qfin in a reflection mode corresponding to the amount of fuel in the purge gas contained in the intermediate gas, even though the amount of fuel in the purge gas contained in the intermediate gas to be taken into the cylinder varies depending on the pattern of switching the inlet. As a result, the fuel injection amount controlled based on the injection amount command value Qfin that reflects the vapor concentration learned value B(k) is less likely to deviate from its proper value.

Next, a manner of changing (setting) the reflection mode of reflecting the vapor concentration learned value B(k) in the injection amount command value Qfin will be described in detail. FIG. 2 is a flowchart illustrating a reflection mode changing routine for changing the reflection mode. The electronic control unit 21 periodically executes the reflection mode changing routine as a timer interrupt at prescribed time intervals.

The electronic control unit 21 determines whether a flag F is "0", as a process in step 101 (S101) of the routine. The flag F is set to "0 (halted)" or "1 (in execution)" depending on whether a changing process for changing the reflection mode is halted or in execution. When the flag F is "0", the electronic control unit 21 determines that the changing process is halted, and proceeds to S102.

As a process in S102, the electronic control unit 21 determines whether the inlet through which the purge gas flows into the intake passage 2 is switched, that is, whether the inlet is switched between the first inlet 9a and the second inlet 10a. When the electronic control unit 21 makes a negative determination in S102, the electronic control unit 21 ends the reflection mode changing routine. On the other hand, when the electronic control unit 21 makes an affirmative determination in S102, the electronic control unit 21 proceeds to S103. The electronic control unit 21 substitutes a current vapor concentration learned value B(k) for a stored value B1 as a process in S103, and sets the flag F to "1 (in execution)" as a process in S104. Note that, the stored value B1 represents the vapor concentration learned value at the time when switching of the inlet is performed. Then, the electronic control unit 21 proceeds to processes in S105 and the following steps for executing the changing process.

When the flag F is set to "1", the electronic control unit 21 makes a negative determination in the process in S101 executed next time and thus the electronic control unit 21 skips the processes in S102 to S104 to directly proceed to S105. When the flag F is set to "1" and the electronic control unit 21 executes the processes in S105 and the following steps for executing the changing process, learning of the vapor concentration learned value B(k) according to Expression (2) is halted.

As the changing process, first, the electronic control unit 21 calculates a cumulative air amount $\Sigma GA$ in S105. The cumulative air amount $\Sigma GA$ is a value obtained by accumulating the amount of air taken into the cylinder of the internal combustion engine 1 from an initial value "0" at the time when the switching of the inlet is performed, and is calculated by Expression (3) indicated below.

Current $\Sigma GA$ immediately preceding $\Sigma GA$+increase amount $\Delta GA$  Expression (3)

In Expression (3), an increase amount $\Delta GA$ represents an amount of air taken into the cylinder during a period of execution of the reflection mode changing routine, and is obtained by the air flow meter 24. As can be understood from Expression (3), the cumulative air amount $\Sigma GA$ calculated in the process in S105 currently executed is obtained by adding the increase amount $\Delta GA$ to the cumulative air amount $\Sigma GA$ calculated in the process in S105 executed in the immediately preceding routine.

The processes in S106 and S107 in the reflection mode changing routine are executed to determine whether the present moment is within a period from the start of an intake of the intermediate gas into the cylinder of the internal combustion engine 1 to the completion of the intake of the intermediate gas into the cylinder of the internal combustion engine 1. The intermediate gas means the gas that is present in the portion of the intake passage 2 between the first inlet 9a and the second inlet 10a at the time when the switching of the inlet is performed. The electronic control unit 21 determines whether the cumulative air amount ΣGA is larger than a first air amount A1, as a process in S106. Then, the electronic control unit 21 determines whether the cumulative air amount ΣGA is less than a second air amount A2, as a process in S107.

The first air amount A1 is an amount of air present between the inlet (the intake port 2a) of the combustion chamber 3 and the first inlet 9a in the intake passage 2, and is a fixed value determined based on the kind of the internal combustion engine 1. The second air amount A2 is an amount of air present between the inlet of the combustion chamber 3 and the second inlet 10a in the intake passage 2, and is a fixed value determined based on the kind of the internal combustion engine 1, like the first air amount A1.

Thus, when the cumulative air amount ΣGA is less than the first air amount A1, the intake of the intermediate gas into the cylinder of the internal combustion engine 1 has not been started yet. In this case, the electronic control unit 21 makes a negative determination in S106 and proceeds to S108. As a process in S108, the electronic control unit 21 substitutes the stored value B1 indicating the vapor concentration learned value at the time of switching the inlet, for the vapor concentration learned value B(k) used for the calculation of the injection amount command value Qfin according to Expression (1). At this time, the vapor concentration learned value B(k) learned at the time of switching the inlet is used, as it is, for the calculation of the injection amount command value Qfin according to Expression (1). After executing the process in S108, the electronic control unit 21 ends the reflection mode changing routine.

When the cumulative air amount ΣGA is larger than the second air amount A2 (S107: NO), the intake of the intermediate gas into the cylinder of the internal combustion engine 1 has been completed. Thus, when the electronic control unit 21 makes an affirmative determination in both S106 and S107, the present moment is within the period from the start of the intake of the intermediate gas into the cylinder of the internal combustion engine 1 to the completion of the intake of the intermediate gas into the cylinder of the internal combustion engine 1. In this case, the electronic control unit 21 proceeds to S109.

As a process in S109, the electronic control unit 21 determines whether the switching of the inlet is switching from the first inlet 9a to the second inlet 10a. When the electronic control unit 21 makes an affirmative determination in S109, the electronic control unit 21 proceeds to S110. Processes in S110 and S111 are executed in order to reflect the vapor concentration learned value B(k) that is made lower than the vapor concentration learned value B(k) at the time of switching the inlet, in the injection amount command value Qfin.

The electronic control unit 21 substitutes "0" for a calculation value B2 related to calculation of the injection amount command value Qfin, as a process in S110, and substitutes the calculation value B2 for the vapor concentration learned value B(k) used for calculation of the injection amount command value Qfin according to Expression (1), as a process in S111. Note that, the calculation value B2 represents the vapor concentration learned value used for calculation of the injection amount command value Qfin during the intake of the intermediate gas. By calculating the injection amount command value Qfin by Expression (1) based on the vapor concentration learned value B(k) for which the calculation value B2 (in this case, "0") is substituted, the vapor concentration learned value B(k) that is made lower than the vapor concentration learned value B(k) at the time of switching the inlet, is reflected in the injection amount command value Qfin. In other words, the vapor concentration learned value B(k) that is less than the stored value B1 is reflected in the injection amount command value Qfin. Then, the electronic control unit 21 ends the reflection mode changing routine.

On the other hand, when the switching of the inlet is switching from the second inlet 10a to the first inlet 9a, the electronic control unit 21 makes a negative determination in S109, and the electronic control unit 21 proceeds to S112. Processes in S112 and S113 are executed in order to reflect the vapor concentration learned value B(k) that is made higher than the vapor concentration learned value B(k) at the time of switching the inlet, in the injection amount command value Qfin.

The electronic control unit 21 doubles the stored value B1 and substitutes the doubled stored value for the calculation value B2 as a process in S112, and substitutes the calculation value B2 for the vapor concentration learned value B(k) used for calculation of the injection amount command value Qfin according to Expression (1), as a process in S111. By calculating the injection amount command value Qfin by Expression (1) based on the vapor concentration learned value B(k) for which the calculation value B2 (in this case, twice the stored value B1) is substituted, the vapor concentration learned value B(k) that is made higher than the vapor concentration learned value B(k) at the time of switching the inlet, is reflected in the injection amount command value Qfin. In other words, the vapor concentration learned value B(k) that is made higher than the stored value B1 is reflected in the injection amount command value Qfin.

As described above, after the inlet through which the purge gas flows into the intake passage 2 is switched, during the period from the start of the intake of the intermediate gas into the cylinder of the internal combustion engine 1 to the completion of the intake of the intermediate gas into the cylinder of the internal combustion engine 1, the vapor concentration learned value B(k) is reflected in the injection amount command value Qfin in a reflection mode changed (set) depending on the pattern of switching the inlet. This makes it possible to reflect the vapor concentration learned value B(k) in the injection amount command value Qfin in a reflection mode corresponding to the amount of fuel in the purge gas contained in the intermediate gas, even though the amount of fuel in the purge gas contained in the intermediate gas taken into the cylinder varies depending on the pattern of switching the inlet.

When the intake of the intermediate gas into the cylinder of the internal combustion engine 1 is completed, the cumulative air amount ΣGA becomes larger than the second air amount A2, and thus the electronic control unit 21 makes a negative determination in S107. In this case, the electronic control unit 21 proceeds to S113. As a process in S113, the electronic control unit 21 substitutes the stored value B1 for the vapor concentration learned value B(k) used for calculation of the injection amount command value Qfin according to Expression (1). Further, the electronic control unit 21 sets the flag F to "0 (halted)" as a process in S114, and then sets the cumulative air amount EGA to an initial value "0" as a process in S115. In this case, the vapor concentration learned value B(k) learned at the time of switching the inlet is used, as it is, for the calculation of the injection amount command value Qfin according to Expression (1). Then, the electronic control unit 21 ends the reflection mode changing routine.

Next, the operation of the control apparatus for the internal combustion engine 1 will be described. After the inlet through which the purge gas flows into the intake passage 2 is switched, during the period from when the intermediate gas at the time of switching starts to be taken into the cylinder of the internal combustion engine 1 until when the intermediate gas is completely taken into the cylinder of the internal combustion engine 1, the vapor concentration learned value B(k) is reflected in the injection amount command value Qfin in a reflection mode changed depending on the pattern of switching the inlet.

More specifically, when the inlet through which the purge gas flows into the intake passage 2 is switched from the first inlet 9a to the second inlet 10a, the intermediate gas at the time of switching the inlet does not contain fuel in the purge gas. Thus, the gas is continuously taken into the cylinder of the internal combustion engine 1 while the purge gas flows through the second inlet 10a into a portion of the intake passage 2 upstream of where the intermediate gas is present. Thus, when the intermediate gas is taken into the cylinder of the internal combustion engine 1, fuel in the purge gas is not contained in the intermediate gas. In this case, during the period from the start of the intake of the intermediate gas into the cylinder of the internal combustion engine 1 to the completion of the intake of the intermediate gas into the cylinder of the internal combustion engine 1, the injection amount command value Qfin is calculated using the vapor concentration learned value B(k) for which "0" is substituted. As a result, the vapor concentration learned value B(k) that is made lower than the vapor concentration learned value B(k) at the time of switching the inlet, is reflected in the injection amount command value Qfin. In this example, "0" is substituted for the vapor concentration learned value B(k), which achieves the same state as that when reflection of the vapor concentration learned value B(k) in the injection amount command value Qfin is halted.

On the other hand, when the inlet through which the purge gas flows into the intake passage 2 is switched from the second inlet 10a to the first inlet 9a, fuel in the purge gas is contained in the intermediate gas at the time when the switching is performed. Thus, the gas is continuously taken into the cylinder of the internal combustion engine 1 while the purge gas flows also through the first inlet 9a into a portion of the intake passage 2 corresponding to where the intermediate gas is present. As a result, when the intermediate gas is taken into the cylinder, the amount of purge gas contained in the intermediate gas is increased (doubled), and thus the amount of fuel in the purge gas contained in the intermediate gas is also increased (doubled). In this case, during the period from the start of the intake of the intermediate gas into the cylinder of the internal combustion engine 1 to the completion of the intake of the intermediate gas into the cylinder of the internal combustion engine 1, the injection amount command value Qfin is calculated using the doubled vapor concentration learned value B(k). As a result, the vapor concentration learned value B(k) that is made higher than the vapor concentration learned value B(k) at the time of switching the inlet, is reflected in the injection amount command value Qfin.

As described above, during the period from the start of the intake of the intermediate gas into the cylinder of the internal combustion engine 1 to the completion of the intake of the intermediate gas into the cylinder of the internal combustion engine 1, the vapor concentration learned value B(k) is reflected in the injection amount command value Qfin in a reflection mode changed depending on the pattern of switching the inlet. This makes it possible to reflect the vapor concentration learned value B(k) in the injection amount command value Qfin in a reflection mode corresponding to the amount of fuel in the purge gas contained in the intermediate gas, even though the amount of fuel in the purge gas contained in the intermediate gas taken into the cylinder varies depending on the pattern of switching the inlet. As a result, it is possible to inhibit the fuel injection amount from deviating from its proper value when the fuel injection amount is controlled based on the injection amount command value Qfin in which the vapor concentration learned value B(k) has been reflected.

The embodiment as described above in detail produces the following advantageous effects. (1) Even though the amount of fuel in the purge gas contained in the intermediate gas to be taken into the cylinder varies depending on the switching pattern in which the inlet through which the purge gas flows into the intake passage 2 is switched between the first inlet 9a and the second inlet 10a (i.e., depending on whether the inlet is switched from the first inlet 9a to the second inlet 10a, or switched from the second inlet 10a to the first inlet 9a), it is possible to reflect the vapor concentration learned value B(k) in the injection amount command value Qfin in the reflection mode corresponding to the amount of fuel in the purge gas contained in the intermediate gas. As a result, it is possible to inhibit the fuel injection amount from deviating from its proper value when the fuel injection amount is controlled based on the injection amount command value Qfin in which the vapor concentration learned value B(k) has been reflected.

(2) When the inlet through which the purge gas flows into the intake passage 2 is switched from the first inlet 9a to the second inlet 10a, the intermediate gas taken into the cylinder of the internal combustion engine 1 does not contain fuel in the purge gas. In this case, during the period from the start of the intake of the intermediate gas into the cylinder of the internal combustion engine 1 to the completion of the intake of the intermediate gas into the cylinder of the internal combustion engine 1, the injection amount command value Qfin is calculated using the vapor concentration learned value B(k) in Expression (1), for which the calculation value B2 adjusted to "0" is substituted. This achieves the same state as that when reflection of the vapor concentration learned value B(k), which is learned at the time of switching the inlet, in the injection amount command value Qfin is halted. As a result, it is possible to inhibit the fuel injection amount controlled based on the injection amount command value Qfin from deviating from its proper value.

(3) When the inlet through which the purge gas flows into the intake passage 2 is switched from the second inlet 10a to the first inlet 9a, the intermediate gas taken into the cylinder of the internal combustion engine 1 contains a doubled amount of purge gas. In this case, during the period from the start of the intake of the intermediate gas into the cylinder of the internal combustion engine 1 to the completion of the intake of the intermediate gas into the cylinder of the internal combustion engine 1, the injection amount command value Qfin is calculated using the vapor concentration learned value B(k) in Expression (1), for which the calculation value B2 adjusted to twice the stored value B1 is substituted. In other words, the vapor concentration learned value B(k), which is learned at the time of switching the inlet, is doubled and the doubled vapor concentration learned value B(k) is reflected in the injection amount command value Qfin. As a result, it is possible to inhibit the fuel injection amount controlled based on the injection amount command value Qfin from deviating from its proper value.

The foregoing embodiment may be modified, for example, as follows. When the inlet through which the purge gas flows into the intake passage 2 is switched from the first inlet 9a to the second inlet 10a, the vapor concentration learned value B(k) (calculation value B2) used for calculation of the injection amount command value Qfin need not be set to "0". For example, the vapor concentration learned value B(k) (calculation value B2) may be just decreased from the vapor concentration learned value B(k) (calculation value B2) at the time of switching the inlet (decreased from the stored value B1).

When the inlet through which the purge gas flows into the intake passage 2 is switched from the second inlet 10a to the first inlet 9a, the vapor concentration learned value B(k) (calculation value B2) used for calculation of the injection amount command value Qfin need not be doubled. For example, the vapor concentration learned value B(k) (calculation value B2) may be just increased from the vapor concentration learned value B(k) (calculation value B2) at the time of switching the inlet (increased from the stored value B1).

The purge gas may be caused to flow from the first branch pipe 9 (through first inlet 9a) into the intake passage 2 using driving of a purge pump, instead of using a negative pressure generated in a portion of the intake passage 2 downstream of the throttle valve 4. In this case, the position of the first inlet 9a may be changed to a position in a portion of the intake passage 2 that is downstream of the second inlet 10a and that is other than the portion of the intake passage 2 downstream of the throttle valve 4. As a result, a higher degree of flexibility in selecting the position of the first inlet 9a is achieved.

Instead of the configuration where the purge pipe 8 branches out into the first branch pipe 9 and the second branch pipe 10 both of which are connected to the intake passage 2, there may be employed a configuration where two individual purge pipes are connected to a portion of the intake passage 2 corresponding to the first inlet 9a and a portion of the intake passage corresponding to the second inlet 10a. In this case, these purge pipes are individually connected to the canister 29.

What is claimed is:

1. A control apparatus for an internal combustion engine, the internal combustion engine configured such that vaporized fuel generated in a fuel tank flows, together with air, into an intake passage as purge gas through a vaporized fuel processing device, and the control apparatus configured to reflect a vapor concentration learned value learned as a concentration of fuel in the purge gas, in an injection amount command value used for fuel injection amount control for the internal combustion engine, the control apparatus comprising:

a switching unit configured to switch an inlet through which the purge gas flows into the intake passage, between a first inlet and a second inlet, the second inlet being provided upstream of the first inlet in the intake passage; and an electronic control unit configured to change a reflection mode of reflecting the vapor concentration learned value in the injection amount command value depending on a pattern in which the inlet is switched by the switching unit, and the electronic control unit configured to reflect the vapor concentration learned value in the injection amount command value in the changed reflection mode, during a period from a start of an intake of gas into a cylinder of the internal combustion engine to completion of the intake of the gas into the cylinder of the internal combustion engine, the gas being gas present in a portion of the intake passage, the portion being between the first inlet and the second inlet, when switching of the inlet through which the purge gas flows into the intake passage is performed by the switching unit.

2. The control apparatus according to claim 1, wherein the electronic control unit is configured to reflect, when the inlet through which the purge gas flows into the intake passage is switched from the first inlet to the second inlet by the switching unit, the vapor concentration learned value that is made lower than the vapor concentration learned value at a time of switching the inlet, in the injection amount command value, during the period from the start of the intake of the gas into the cylinder of the internal combustion engine to the completion of the intake of the gas into the cylinder of the internal combustion engine, the gas being the gas present in the portion of the intake passage, the portion being between the first inlet and the second inlet, when the switching of the inlet is performed.

3. The control apparatus according to claim 1, wherein the electronic control unit is configured to reflect, when the inlet through which the purge gas flows into the intake passage is switched from the second inlet to the first inlet by the switching unit, the vapor concentration learned value that is made higher than the vapor concentration learned value at a time of switching the inlet, in the injection amount command value, during the period from the start of the intake of the gas into the cylinder of the internal combustion engine to the completion of the intake of the gas into the cylinder of the internal combustion engine, the gas being the gas present in the portion of the intake passage, the portion being between the first inlet and the second inlet, when the switching of the inlet is performed.

* * * * *